United States Patent [19]

Winkler et al.

[11] Patent Number: 5,007,157

[45] Date of Patent: Apr. 16, 1991

[54] MACHINE TOOL

[75] Inventors: Hans-Henning Winkler, Tuttlingen; Eugen Rütschle, Mühleim, both of Fed. Rep. of Germany

[73] Assignee: Chiron-Werke GmbH & Co. KG, Tuttlingen, Fed. Rep. of Germany

[21] Appl. No.: 578,875

[22] Filed: Sep. 6, 1990

[30] Foreign Application Priority Data

Sep. 9, 1989 [DE] Fed. Rep. of Germany ....... 3930071

[51] Int. Cl.⁵ .......................................... B23Q 3/157
[52] U.S. Cl. ...................................................... 29/568
[58] Field of Search ................. 29/568, 26 A, 33 P; 414/277, 286, 268; 211/115

[56] References Cited

U.S. PATENT DOCUMENTS

| 4,240,194 | 12/1980 | Sumiaki et al. | 29/568 |
| 4,546,533 | 10/1985 | Hallbach et al. | 29/568 |

FOREIGN PATENT DOCUMENTS

| 3440356 | 5/1984 | Fed. Rep. of Germany . | |
| 3306097 | 8/1984 | Fed. Rep. of Germany | 29/568 |
| 3335330 | 10/1984 | Fed. Rep. of Germany | 29/568 |
| 3607391 | 3/1986 | Fed. Rep. of Germany . | |
| 216667 | 7/1983 | German Democratic Rep. | 29/568 |
| 215269 | 11/1984 | German Democratic Rep. | 29/568 |
| 226502 | 8/1985 | German Democratic Rep. | 29/568 |
| 236041 | 5/1986 | German Democratic Rep. | 29/568 |
| 119347 | 9/1981 | Japan | 29/568 |
| 201147 | 12/1982 | Japan | 29/568 |
| 54060 | 3/1984 | Japan | 29/568 |
| 76744 | 5/1984 | Japan | 29/568 |
| 201739 | 11/1984 | Japan | 29/568 |
| 127936 | 7/1985 | Japan | 29/568 |

*Primary Examiner*—William Briggs
*Attorney, Agent, or Firm*—Pretty, Schroeder, Brueggemann & Clark

[57] ABSTRACT

A machine tool comprises a travelling support (13) carrying a headstock (14) and arranged for being displaced relative to a machine table (12). The travelling support is equipped with a magazine (20). The tool magazine (20) is exchangeable. A stationary rack (24) arranged in the travelling area of the travelling support (13) carries a plurality of tool magazines (20a). Transfer means (21) are arranged on the travelling support (13) on the one hand and the rack (24) on the other hand for exchanging tool magazines (20, 20a) between the rack (24) and the travelling support (13) (FIG. 3).

5 Claims, 3 Drawing Sheets

MACHINE TOOL

The present invention relates to a machine tool comprising a travelling support carrying a headstock and arranged for being displaced relative to a machine table, and equipped with an exchangeable tool magazine, further a stationary rack arranged in the travelling area of the travelling support and carrying a plurality of exchangeable tool magazines, and transfer means arranged on the travelling support on the one hand and the rack on the other hand for exchanging tool magazines between the rack and the travelling support.

A machine tool of the described type has been known from document DE-A-34 40 356.

Machine tools of the described type have been generally known as so-called "travelling support machines". It is characteristic of such machine tools, which may be designed in the form of so-called machining centers for carrying out milling and drilling operations, that tool holders equipped with tools are transferred by means of a tool changing device between the tool magazine and a receptacle of the headstock, and vice versa. It is thus possible to carry out different machining processes on workpieces mounted on the machine table, in succession and in a predetermined manner, with the aid of a numerical control.

However, as the machining processes become more and more complex, an ever greater number of different tools is required for machining a workpiece without having to change the machine setting. One has, therefore, equipped machine tools of the type of interest in the present case with tool magazines designed for accepting the greatest possible number of tool holders. Given, however, that the tool magazines are displaced together with the travelling support, in order to enable tool changes to be effected in any position relative to the machine table, there are limits to the size of the tool magazines as in the case of excessively big tool magazines the masses to be moved also become too important.

The before-mentioned document DE-A-34 40 356 describes a machine tool where both the tools and the tool magazines are changed automatically. This known machine tool uses a spindle with an axis extending in the horizontal direction. Laterally beside the headstock a tool magazine is fixed to a receiving station arranged for travelling together with the headstock. The tool magazine comprises an endless track extending in a vertical plane. Tools, which are arranged in such a way that their axes also extend in the same plane, are guided to move along the endless track. By moving the endless track in a convenient manner, a particular selected tool can be brought into a foremost position in the endless track so that its axis comes to lie parallel to the spindle axis. A short, two-armed tool changing gripper arranged midway between this tool and the spindle receptacle is likewise mounted to rotate about a horizontal axis and serves for transferring the tools in both directions between the spindle receptacle and the foremost position of the endless track.

A storage for additional tool magazines arranged behind the movable headstock accommodates a plurality, for example five, tool magazines located beside each other. Now, the movable headstock can be moved into a position where its receiving station is positioned immediately opposite one of the storage positions of the tool magazine storage. In this position, the complete tool magazine can be transferred from the headstock to the tool magazine storage or vice versa.

In the case of the known machine tool, all active moving components are arranged on the travelling headstock, including the drive for the endless track of the tool magazine located in the receiving station and the transfer drive by means of which the tool magazine is transferred from the storage to the headstock.

Consequently, it is a disadvantage of the known machine tool that the headstock constantly has to drag along heavy and complicated moving elements which has negative effects on both the travelling speed and the dynamics of the headstock drive. In addition, the known machine tool is connected with the disadvantage that the tool magazines stored in the storage are absolutely passive, which means that they can be withdrawn from the storage only by means of the before-mentioned transfer drive.

The same applies by analogy to another known machine tool described by document U.S. Pat. No. 4,240,194. In the case of this known machine tool, the complete tool magazine can also be transferred in both directions between a position on the travelling headstock and one of a plurality of stationary storage positions. The tools of this known machine tool are arranged about the circumference of a cylindrical drum which can be rotated about a horizontal axis. The axes of the tools arranged on the drum extend likewise in horizontal direction, as does the spindle axis. This machine tool has the additional disadvantage that the tools positioned in the tool magazine on the headstock extend in a direction perpendicular to the spindle axis so that a relatively complex tool changing device must be provided. Besides, this known machine tool is likewise connected with the before-described disadvantages, i.e. all active elements are likewise arranged on the travelling headstock.

Another machine tool where complete tool magazine can be transferred between a stationary storage and a travelling headstock has been known from document DD-A-216 667. This machine tool also has a horizontal spindle axis. However, the tool magazines of this machine tool are arranged in a revolving storage designed in the form of a drum with a horizontal axis, with guide rails intended to receive tool magazines arranged along its periphery, the tools in the tool magazines extending in radial direction relative to the tool magazine storage.

In the case of this known machine tool, all the elements required for effecting the tool magazine change are again arranged on the travelling headstock, as are the drive elements for the endless track of the tool magazines.

Document DE-A-36 07 391 describes still another machine tool where a tool magazine and an endless track extending in a horizontal plane are provided in fixed arrangement at the rear and the top of a machining center. A stationary rail arranged behind this tool magazine serves as track for a travelling tool carriage. The tool carriage in its turn contains a tool magazine with an endless track extending in a vertical plane. The tool carriage can be moved to a transfer position behind the machining center, in which transfer position a tool change can be effected between the tool magazine on the machining center and the tool magazine of the tool carriage, using a tool-changing device provided on the tool carriage. The endless track of the tool magazine on the tool carriage is equipped for this purpose with an autonomous drive.

However, this known machine tool is connected with the drawback that the machining center or at least its magazine must be brought into a stationary position while the tool change is effected between the tool magazine of the machining center and the tool magazine of the tool carriage. Given the plurality of tools to be changed, this requires some time during which the machining center and/or its tool magazine must not perform any independent movements in space. Consequently, this known machine tool is suited only for use in connection with a stationary machining center with stationary tool magazine. In addition, it is an unavoidable consequence that the machining center cannot perform any operations on workpieces during the tool transfer between the two before-mentioned tool magazines. Given the considerable size of the tool magazines on the machining center and on the tool carriage this, therefore, results in considerable downtimes because it takes some time until all tools have been transferred between the two tool magazines.

Now, it is the object of the present invention to improve a machine tool of the before-described type in such a way that the set-up times required for changing over from one machining operation to the next are further reduced.

This object is achieved according to the invention by the fact that the tool magazines are equipped with an autonomous magazine drive which can be operated, via detachable energy connection means, both in a position of the tool magazine on the rack, and on the travelling support.

This solves the object underlying the invention fully and perfectly because the tool magazines stored in the rack can be re-tooled, i.e. equipped with new tool holders, while one of the tool magazines on the travelling support is in operation on the workpiece. It is thus possible to reduce the downtimes of the machine tool between two machining operations. For, the higher tool capacity of the machine tool according to the invention may be utilized in this case for preparing the tool magazine on the rack for the next machining operation to be performed on new workpieces, while another machining operation using another tool type is still being carried out. The downtime of the machine tool is in this case limited to the time required for mounting the new workpiece on the machine table. In addition, it is also possible to have the re-tooling of the new tool magazine carried out during machining of the former workpieces by the same operator who is also responsible for the operation the machine tool, the operator having sufficient time, during the numerically controlled machining operation being carried out on the former workpieces, for re-tooling the next tool magazine (or several additional tool magazines) for the next following machining operations. Consequently, the invention also enables the capacity of the operators of the machine tools to be utilized to greater profit. Above all, however, the invention provides the advantage that re-tooling of the tool magazine is simplified also in the position of the tool magazine on the rack because an operator in charge of this operation can move the different receptacles of the tool magazine into a position in which they are accessible from the outside, by suitable operation of the magazine drive.

According to a preferred embodiment of the invention, the axis of the headstock extends in the vertical direction, and the tool magazine is provided with an endless track for tools extending in parallel to a horizontal machine table.

These features provide the advantage that a particularly simple motion sequence is achieved for both the magazine changing and the tool changing operations.

A particularly preferred embodiment of the machine tool according to the invention provides that a transfer drive is provided on the rack for displacing a tool magazine between the rack and the travelling support.

This feature provides the advantage to reduce the masses on the travelling support that have to be moved. In addition, the demands placed on the dimensions of the transfer drive need not be so stringent as would be the case if the transfer drive were arranged on the moving travelling support.

According to certain embodiments of the invention, tool magazines may be arranged on the rack beside each other and/or below each other. Preferably, such an arrangement can be provided at the rear of the machine tool, i.e. on the side of the machine tool opposite the control panel.

It is possible in this way to arrange a plurality of tool magazines on the rack, in the manner of a matrix, and to select such magazines by displacing the travelling support along one or several coordinates.

Other advantages of the invention will appear from the specification and the attached drawing.

It is understood that the features that have been described before and will be explained hereafter may be used not only in the described combinations, but also in any other combination, or individually, without leaving the scope and intent of the present invention.

One embodiment of the invention will now be described in more detail with reference to the drawing in which.

Figure 1:
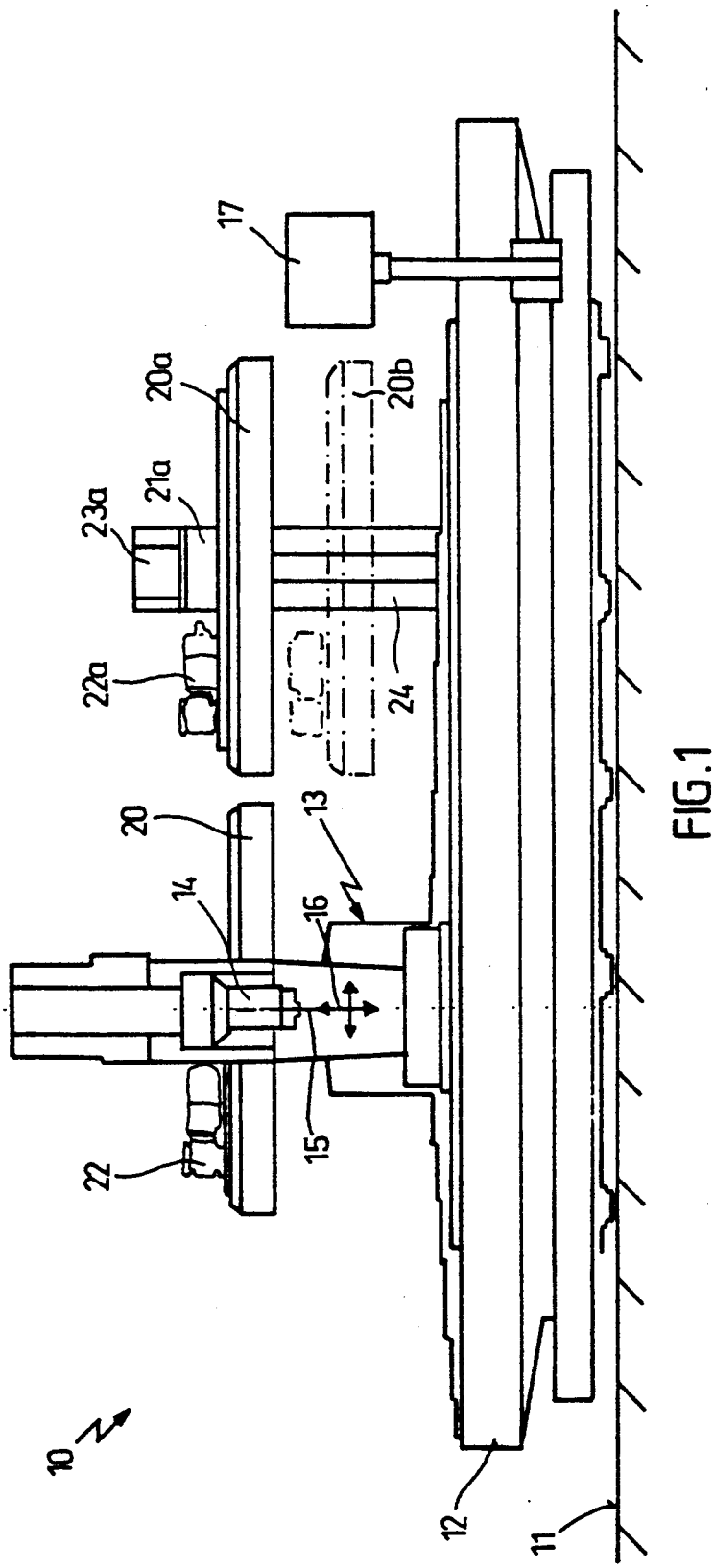
FIG. 1 shows a front view of one embodiment of a machine tool according to the invention.

In the figures, one embodiment of a machine tool according to the invention is indicated generally by reference numeral 10. The illustrated machine is a so-called machining center intended essentially for carrying out drilling and milling operations on workpieces.

A base 11 carries a machine table 12 designed as a long-bed machine table. A travelling support 13 can be displaced relative to the machine table 12 in a manner known as such. The travelling support 13 carries a headstock 14 with a vertical spindle axis 15.

Usually, the arrangement is such that the travelling support 13 can be displaced in the longitudinal direction of the machine table 12, along a horizontal axis. The headstock 14 can be displaced on the travelling support 13 along another horizontal axis extending perpendicularly thereto, and also along a vertical axis. As a result, the tools mounted in the headstock 14 can be displaced in at least three coordinate directions, as indicated by arrows 16.

The machine tool 10 is numerically controlled. A control panel 17 intended for this purpose is arranged at the front, i.e. at the control side of the machine tool 10.

The travelling support 13 is equipped with a tool magazine 20 extending substantially in parallel to the machine table 12. The tool magazine 20 may have a conventional T or U design, viewed from the top.

The tool magazine 20 is mounted on the travelling support 13 in exchangeable arrangement.

The exchange is effected by a transfer arrangement 21 provided on both the travelling support 13 and a stationary rack 24 at the rear of the machine tool 10. The transfer device 21 may consist, for example, of rails arranged on the travelling support 13 and the rack 24, in a direction perpendicular to the longitudinal extension of the machine table 12.

In order to effect the exchange of a tool magazine 20 between the travelling support 13 and the rack 24, the travelling support 13 is then moved into a position in which the transfer devices 21 on the travelling support 13 and the rack 24, i.e. the before-mentioned rails, are aligned with each other. This position is indicated by 20' in FIG. 3.

Once this position has been reached, a transfer drive 23 arranged on the rack 24 is set into operation for displacing the tool magazine 20 from the transfer device 21 of the travelling support 13 into the complementary transfer device 21 on the rack 24. The transfer drive 23 may be constituted, for example, by a pneumatic piston-and-cylinder unit.

In order to have a plurality of tool magazines 20 ready for exchange on the rack 24, they may be arranged one beside the other, as indicated by 20, 20a in the figures. However, a superimposed arrangement, as indicated by 20a, 20b in FIG. 1, is also imaginable. If the capacity is to be further increased, tool magazines may also be arranged above and below each other. In this case, the travelling support 13, together With its transfer device 21, must be displaced in the vertical and horizontal directions until the desired transfer position has been reached.

A magazine drive indicated by 22 in the figures serves for transporting the tool holders along an endless track in the tool magazine. This makes it possible to transfer any tool holder contained in the tool magazine to the removal and/or mounting position of the tool magazine 20.

With the tool magazine 20 docked on the travelling support 13, this serves for keeping ready a predetermined succession of tool holders for a tool change, while with the tool magazine 20 on the rack 24 the magazine drive 22 may also be used for re-tooling the tool magazine 20.

Figure 2:
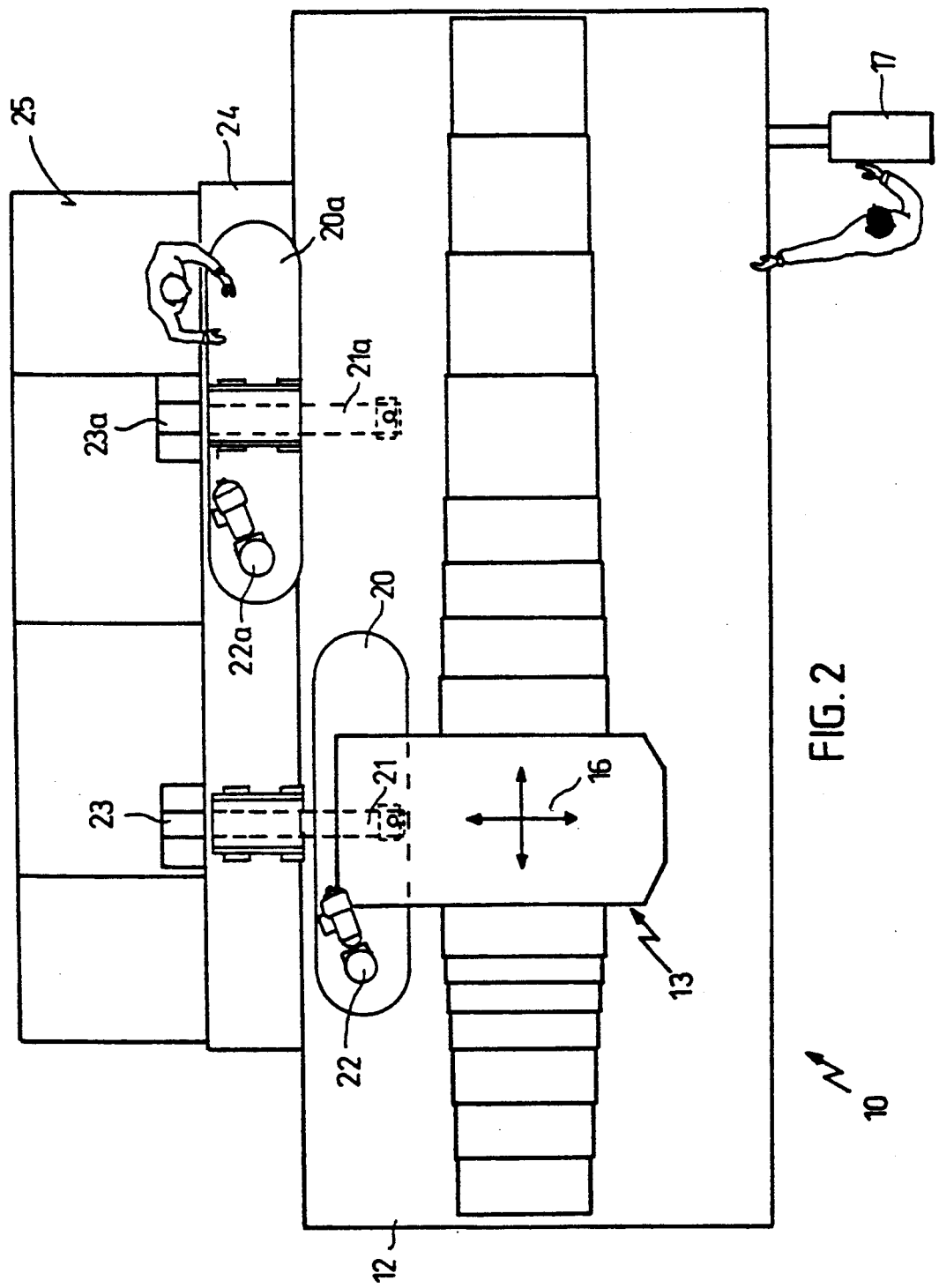
FIG. 2 shows a top view of the machine tool illustrated in FIG. 1.
Figure 3:
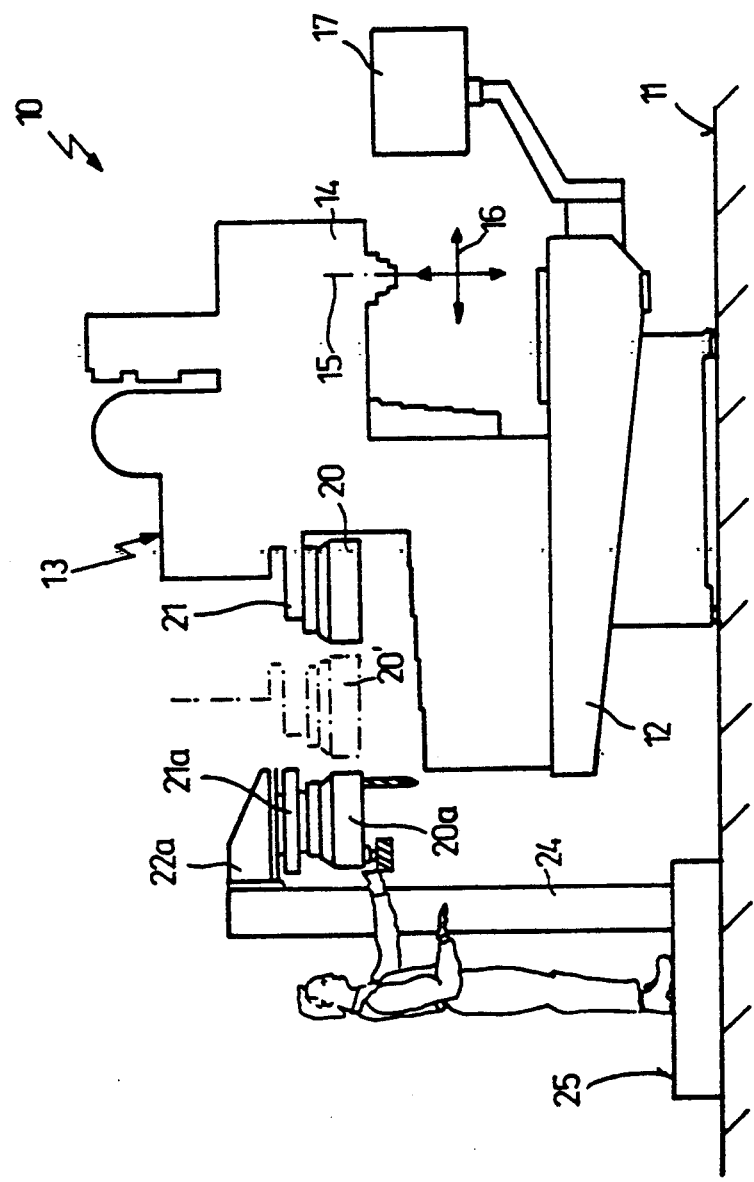
FIG. 3 shows a side view of the machine tool illustrated in FIG. 1.

In this connection, it can be seen best in FIGS. 2 and 3 that a mounting position 25 is provided behind the machine tool 10, in which the tool holders of the tool magazine 20 present in a rack position can be exchanged. The magazine drive 22 or 22a must then be supplied with energy via detachable connection means, for which purpose conventional plug connections or other detachable connection elements may be arranged on both the travelling support 13 and the rack 24.

Further details concerning the toolholder magazine 20 may be taken from applicant's co-pending U.S. patent application Ser. No. 07/247,252 filed Sept. 21, 1988 now abandoned and applicant's co-pending U.S. Pat. Nos. 4,642,875 issued Feb. 17, 1987 and 4,683,638 issued Aug. 4, 1987, the disclosure of which being incorporated herein by reference.

We claim:

1. A machine tool comprising:
   a stationary machine bed;
   a support;
   means for displacing said support relative to said machine bed within a predetermined operating area;
   a spindle stock arranged on said support for being displaced therewith, said spindle stock having a first receptacle for receiving a detachable toolholder magazine therein, said first receptacle being provided with first transfer means for transferring said toolholder magazine and being provided with first connector means for feeding energy to said toolholder magazine;
   a stationary rack arranged within said operating area, said rack having a plurality of second receptacles, said second receptacles being each provided with second transfer means for transferring a toolholder magazine and being each provided with second connector means for feeding energy to said toolholder magazine;
   a plurality of toolholder magazines, each having transfer elements for being transferred between said first receptacle on said spindle stock and one of said second receptacles on said rack, said toolholder magazines having each individual drive means for transporting toolholders within said toolholder magazine, said drive means being linked to third connectors mating said first or said second connector, respectively, when said toolholder magazine is inserted into said first or said second receptacle, respectively.

2. The machine tool of claim 1, wherein a drive for said second transfer means is provided on said rack for displacing a tool magazine between said rack and said spindle stock.

3. The machine tool of claim 1, wherein said spindle stock has an axis extending in a vertical direction, said toolholder magazine being provided with an endless track for toolholders extending in parallel to a horizontal machine table.

4. The machine tool of claim 1, wherein toolholder magazines are arranged on said rack one beside the other.

5. The machine tool of claim 1, wherein tool magazines are arranged on said rack with one below each other.

* * * * *